United States Patent [19]

Lisi et al.

[11] 4,449,569
[45] May 22, 1984

[54] METHOD AND APPARATUS FOR REGULATING FLUID FLOWS IN PARALLEL-CONNECTED CONDUITS (E.G. IN FURNACE INSTALLATIONS HAVING AIR PREHEATERS AND BY-PASS CONDUITS)

[75] Inventors: Edward L. Lisi, Morristown, N.J.; Juul A. Melleby; Arne Andersson, both of Tolvsroed, Norway

[73] Assignee: Exxon Research and Engineering Co., Florham Park, N.J.

[21] Appl. No.: 354,920

[22] Filed: Mar. 8, 1982

[30] Foreign Application Priority Data

Mar. 24, 1981 [GB] United Kingdom ................. 8109212

[51] Int. Cl.³ .................... G05D 23/00; G05D 15/00; B60H 1/00; F28F 27/00
[52] U.S. Cl. ......................................... 165/1; 165/32; 165/35; 165/36; 165/38; 165/40; 110/162
[58] Field of Search ....................... 165/35, 36, 37, 38, 165/32, 33, 34, 40, 1; 110/162, 163

[56] References Cited

U.S. PATENT DOCUMENTS

| | | | |
|---|---|---|---|
| 1,927,215 | 9/1933 | Peebles | 165/35 |
| 2,570,859 | 10/1951 | Rasmussen | 165/34 |
| 3,813,039 | 5/1974 | Wells | 165/38 |
| 4,012,191 | 3/1977 | Lisankie et al. | 432/179 |
| 4,044,605 | 8/1977 | Bratthall | 165/11 |
| 4,257,395 | 3/1981 | Wieder | 165/32 |
| 4,291,750 | 9/1981 | Clyne et al. | 165/35 |
| 4,371,027 | 2/1983 | Jacobsen | 165/1 |
| 4,381,814 | 5/1983 | Funk | 165/34 |

Primary Examiner—William R. Cline
Assistant Examiner—John K. Ford
Attorney, Agent, or Firm—Donald F. Wohlers

[57] ABSTRACT

Fluid flow in parallel-connected conduits is regulated by sensing the pressures and/or temperatures at the junctions of the conduits, and regulating the supply of power to a fluid propelling means operable in one of the conduits in accordance with a signal which is representative of the sensed pressure drop and/or temperature drop between the junctions. In a furnace installation having an air preheater (14) in a duct (12) and a parallel-connected by-pass duct (18), the pressure difference and/or temperature difference between the junctions (19, 20) of the ducts (12, 18) is/are employed to generate a signal which regulates the supply of power to an induced draft fan (17) in the air preheater duct (12). The damper (21) normally provided in the by-pass duct (18) may be removed or set at its open position.

8 Claims, 2 Drawing Figures

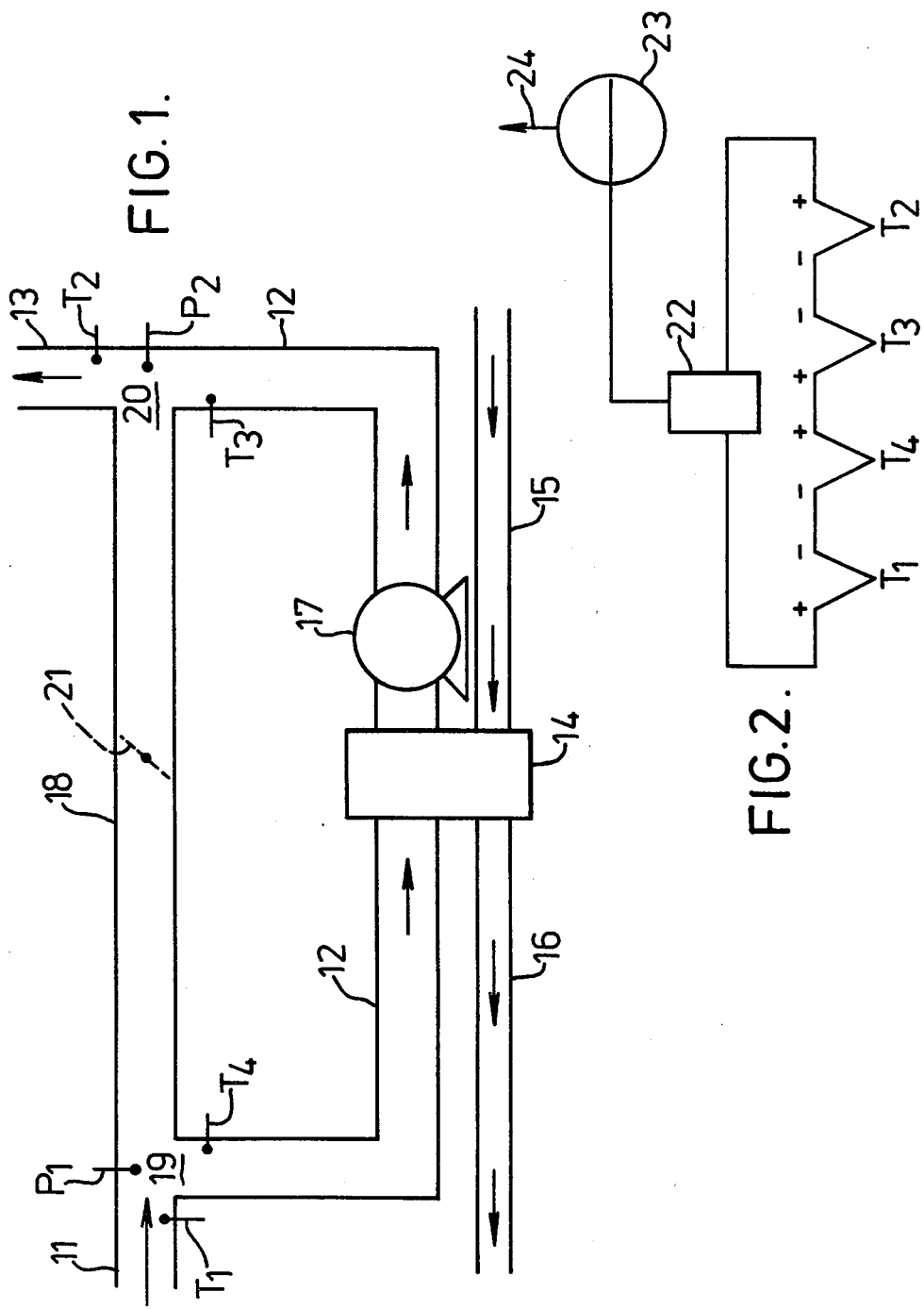

METHOD AND APPARATUS FOR REGULATING FLUID FLOWS IN PARALLEL-CONNECTED CONDUITS (E.G. IN FURNACE INSTALLATIONS HAVING AIR PREHEATERS AND BY-PASS CONDUITS)

The present invention relates to a method and apparatus for regulating fluid flows in parallel-connected conduits, and also to an installation having parallel-connected conduits provided with such apparatus.

In one aspect, the present invention provides a method of regulating fluid flow from a first conduit via a second conduit to a third conduit wherein a fourth conduit extends between the (first) junction of the first and second conduits and the (second) junction of the second and third conduits, the method comprising sensing the fluid temperature $T_1$ and/or pressure $P_1$ in the first conduit at or near to the first junction, sensing the fluid temperature $T_2$ and/or pressure $P_2$ in the third conduit at or near to the second junction, and providing power to fluid-propelling means, operable to propel fluid through the second conduit, in an amount which is related to the pressure difference $P_1-P_2$ and/or the temperature difference $T_1-T_2$ whereby to regulate the flows of fluid through the second and fourth conduits.

In another aspect, the present invention provides apparatus for regulating fluid flow from a first conduit via a second conduit to a third conduit and wherein a fourth conduit extends between the (first) junction of the first and second conduits and the (second) junction of the second and third conduits, the apparatus comprising means for sensing the fluid temperature $T_1$ and/or pressure $P_1$ in the first conduit at or near to the first junction, means for sensing the fluid temperature $T_2$ and/or pressure $P_2$ in the third conduit at or near to the second junction, fluid-propelling means operable to propel fluid through the second conduit, and means operable to supply power to the fluid-propelling means in an amount related to the pressure difference $P_1-P_2$ and/or the temperature $T_1-T_2$ whereby to regulate the flows of fluid through the second and third conduits.

Preferably, heat is removed from, or added to, the fluid passing through the second conduit at a heat transfer location.

Preferably, the temperature $T_3$ and/or pressure $P_3$ in the second conduit is or are sensed downstream of the heat-transfer location, and the power supplied to the propelling means to regulate the flow of fluid through the second conduit is regulated in accordance with the temperature difference $T_2-T_3$ and/or the pressure difference $P_2-P_3$.

The power supplied is preferably regulated to an amount such that $T_2-T_3$ and/or $P_2-P_3$ is and/or are substantially zero.

The temperature $T_4$ and/or pressure $P_4$ in the second conduit upstream of the heat transfer location may be sensed, and the power supplied to the propelling means to regulate the flow of fluid through the second conduit regulated in accordance with the temperature difference $T_1-T_4$ and/or pressure difference $P_1-P_4$. The power is preferably regulated to an amount such that $T_1-T_4$ and/or $P_1-P_4$ is and/or are substantilly zero.

The said temperatures and/or pressures are preferably sensed by sensors which may be so connected, e.g., in series-opposition, as to generate a signal regulating the supply of power to the fluid-propelling means.

In yet a further aspect, the invention provides an installation comprising a first conduit connected for fluid flow via a second conduit to a third conduit, and having a fourth conduit which extends between the (first) junction of the first and second conduits and the (second) junction of the second and third conduits, and further comprising apparatus as hereinabove described for regulating fluid flow from the first conduit via the second conduit to the third conduit.

The installation preferably comprises heat transfer means for effecting heat transfer to or from fluid passing through the second conduit. The heat transfer means may be a combustion air preheater for transferring heat from fluid in the second conduit to air passing to equipment which consumes heated air (e.g. a furnace or engine).

In one embodiment of the invention, the installation comprises equipment which consumes heated air (e.g. a furnace), and wherein the first conduit is connected to receive flue gas or exhaust gas from the equipment, the third conduit forms part of a connection to a stack (or other gas-discharge means), the fourth conduit is a by-pass duct, and the fluid-propelling means is an induced-draft fan downstream of the air preheater.

The installation may comprise at least one damper or other conduit-obstructing device operable for opening and at least partly closing the fourth conduit.

The invention is now described with reference to a non-limitative example thereof and with reference to the accompanying diagrammatic drawings in which:

FIG. 1 depicts some features of a furnace installation in accordance with the invention; and FIG. 2 shows one type of control arrangement which can be used with the installation of FIG. 1.

In FIG. 1, flue gas from a furnace is conducted by a first conduit 11 to a second conduit 12 which discharges gas therefrom to a third conduit 13 connected to a stack. The gas passing along the second conduit 12 passes in heat transfer relationship with cool air in an air-preheater 14 whereby heat is transferred to the cool air. The cool air passes to the preheater 14 from a cool-air conduit 15 and heated air is conducted from the air-preheater 14 to the furnace via a heated air conduit 16. An induced draft fan 17 is operable to cause flue gas to flow through the air preheater 14.

A fourth conduit 18 extends between the first and third conduits 11, 13 in parallel with second conduit 12 so as to provide a by-pass around the air-preheater 14. One end of the fourth conduit 18 is connected to the first and second conduits 11, 12 at a first junction 19, and the other end of the fourth conduit 18 is connected to the second and third conduits 12, 13 at a second junction 20.

Heretofore, it has been the practice to provide a damper 21 of any suitable type (e.g. comprised of a number of pivotable louvre elements) in the fourth conduit 18, and during normal operation of the furnace, the damper 21 has been maintained tightly closed to ensure that substantially all of the flue gas from the furnace passes via the second conduit 12 and air preheater 14 to the third conduit 13 so as to provide the maximum amount of heat transfer to the cool air passing in heat exchange relationship therewith in the air pre-heater 14 from the cool air conduit 15. The purpose of providing the damper 21 is to ensure that if the operation of the fan 17 should be interrupted by some mechanical and/or electrical failure, or for some other reason, which has the effect of virtually blocking or closing the flue gas path through the second conduit 18, the furnace can still be operated by opening the damper 21 to provide an alternative path for the discharge of flue gas via the fourth conduit 18.

This prior practice has not been entirely satisfactory for a number of reasons, the principal reasons being the formation of deposits on the damper 21 and distortion thereof which cause difficulty or prevent the opening of the damper 21 in the event of non-operation of the fan 17.

In the practice of the present invention, the damper 21 may be removed or maintained at least partially open, or more preferably, fully open. The power supplied to the fan is regulated to ensure that substantially all the flue gas produced by the furnace passes from the first conduit 11 into the second conduit 12 to ensure a maximum preheat of the cool air entering the air preheater 14 from the cool air conduit 15. The amount of power supplied to the fan 17 may be a function of the pressures and/or temperatures at or near to the junctions 19, 20 at each end of the fourth conduit 18.

When the pressures at each end of the fourth conduit 18 are to be employed to regulate the operation of the fan 17, a pressure-sensing device $P_1$ is installed to sense the pressure at the junction 19, and a similar pressure-sensing device $P_2$ is installed to sense the pressure at the other junction 20. The pressure difference $P_1 - P_2$ is a function of the amount of gas passing through the fourth conduit 18, and a signal representative of $P_1 - P_2$ is derived and employed to control the power supplied to the fan 17 until $P_1 - P_2$ attains a desired value. Various means for controlling the power supply to the fan 17 as a function of $P_1 - P_2$ will be known to those skilled in the art. When the fan 17 is operating normally, the desired flow of gas through the fourth conduit 18 will be zero, and for this operating condition $P_1 - P_2 = 0$. It will be appreciated that regulation of gas flow may alternatively be achieved by sensing the temperatures at the junctions 19 and 20 and regulating the power supplied to the fan 17 in accordance with the deviation of the difference in temperature from a desired value. This latter approach is less preferred for controlling the power supply to the fan 17 because the temperature at the junction 19 will depend on the furnace's heat output while the temperature at the junction 20 will be virtually independent of the furnace loading when no flue gas passes through the fourth conduit 18. Nevertheless, it is possible, albeit more complicated, to regulate the power supplied to the fan 17 in accordance with the deviation of the temperature difference between the junction 19 and the junction 20 from a desired value for the furnace firing rate. Moreover, a combination of pressure differences and temperature differences may be employed in an analogous manner for the same purpose.

The use of a signal representative of $P_1 - P_2$ (and/or temperature differences) to control the power supply to the fan 17 may not be completely satisfactory for accurate gas-flow control in some installations, particularly if the resistance to gas flow is very small in the fourth conduit 18 (e.g. in the absence of a damper 21) since even a very small deviation from a desired value of $P_1 - P_2$ (or equivalent temperature differences) could, in some instances, cause undesirably large gas flows in the fourth conduit 18. More accurate control may be achieved by monitoring the pressure and/or temperature of gas in each conduit at or near to the junctions 19 and 20. In the following description, temperatures are employed for gas flow control. However, it will be appreciated that pressures may be employed in a similar manner, or a combination of temperatures and pressures, although it will be preferred to use temperatures for gas flow control since the pressure differences from which the gas flow control signals are derived in this illustrative embodiment of the invention may be so small that they may be of the same order, or smaller, than the accuracy of the pressure sensors presently available. However, for other applications of the invention, it may be preferred to monitor pressures for gas flow control, e.g. where fluids flow through conduits without any substantial temperature change.

In FIG. 1, the temperature $T_1$ in the first conduit 11 is monitored by a suitable sensor $T_1$ at or near to the junction 19 and the temperature $T_2$ in the third conduit 13 is monitored by a sensor $T_2$. The temperature $T_3$ in the second conduit 12 at or near to junction 20 is monitored by sensor $T_3$ and the temperature $T_4$ in the second conduit 12 at or near to junction 19 is monitored by sensor $T_4$. The temperature drop across the length of the conduit 12 is thus $T_4 - T_3$.

The temperature difference $T_2 - T_3$ is a function of the relative flows of gas through the air preheater 14 and the fourth conduit 18. When $T_2 - T_3 = 0$, no gas is passing through the fourth conduit 18 from the first conduit 11 (i.e. no gas is passing via the fourth conduit 18 from the junction 19 to the junction 20), although some gas may be passing through the fourth conduit 18 from the outlet of the second conduit 12 at junction 20 to the inlet at junction 19. This latter mode is detectable by measuring the temperature difference $T_1 - T_4$, which will be zero except when gas is passing from the junction 20 to the junction 19 through the fourth conduit 18. Thus if signals representative of $T_2 - T_3$ and $T_1 - T_4$ are derived, they can be employed to modulate the amount of power supplied to the fan 17 to obtain desired relative gas flow rates in the second conduit 12 and fourth conduit 18 and also to control the direction of gas flow. FIG. 2 shows how four temperature sensors (e.g. thermocouples can be connected to sum the temperature differences $T_1 - T_4$ and $T_2 - T_3$ so that a single output signal can be derived to regulate the power supply to the fan 17. The temperature sensors are arranged in series opposition in the sequence: $T_1, T_4, T_3, T_2$ so that $T_1 - T_4$ and $T_2 - T_3$ are summed in the correct sense to modulate $T_4 - T_3$ which is representative of the temperature drop across the preheater 14. The sensors are non-grounded, as depicted. The sum of $(T_1 - T_4) - (T_2 - T_3)$ produces a signal which is converted to an analogous voltage by transducer 22. The analogous voltage is relayed to a temperature indicator and controller 23 which generates a signal in line 24 to regulate the power supplied to the fan 17.

For improved accuracy of temperature monitoring, each sensor may, in practice, be replaced by an array of sensors in the gas stream so connected that the indicated sensed temperature is more or less the average of the temperatures sensed by the array.

If it is desired that all the flue gas should pass through the preheater 14, the signal received by the controller 23 should be analogous to a zero signal received by the transducer 22. If there is any deviation from a zero signal, the controller 23 generates an appropriate signal to change the power supplied to the fan 17 to eliminate the deviation.

On the other hand, if a partial flow of gas through both the preheater 14 and fourth conduit 18 is required, as determined by an appropriate set point value of the controller 23, the signal received by controller 23 from transducer 22 will be compared with the set point value to generate a power regulating signal to control the operation of the fan 17 so that the desired partial flow takes place.

As stated above, the invention may be practiced employing pressure sensors in place of, and also in combination with, the temperature sensors particularly described with reference to FIGS. 1 and 2.

We claim:

1. A method of regulating fluid flow from a first conduit via a second conduit including an air preheater and fluid-propelling means to a third conduit wherein a fourth conduit extends between the (first) junction of the first and second conduits and the (second) junction of the second and third conduits, the method comprising sensing the fluid temperature $T_1$, in the first conduit adjacent the first junction, sensing the fluid temperature $T_2$ in the third conduit adjacent the second junction, sensing the fluid temperature $T_3$ in the second conduit adjacent the second junction, sensing the fluid temperature $T_4$ in the second conduit adjacent the first junction, and providing power to said fluid-propelling means to propel fluid through the second conduit in an amount sufficient to overcome the fluid pressure drop in said air-preheater and in accordance with the summation of $(T_1-T_4)-(T_2-T_3)$ to modulate the amount of power to said fluid-propelling means and thereby regulate the relative flows of fluid through the second and fourth conduits.

2. A method as in claim 1 in which the power supplied to the fluid-propelling means is regulated to an amount such that $(T_1-T_4)-(T_2-T_3)$ tends to zero whereby the flow of fluid in the fourth conduit is substantially zero.

3. A method as in claim 2 in which the said temperatures are sensed by sensors which are connected in such a manner as to generate a signal regulating the supply of power to the fluid-propelling means.

4. A method as in claim 3 in which the said sensors each comprise an array of sensors in the respective fluid stream and which are so connected that the respective indicated sensed temperatures are the respective averages of the temperatures sensed by the arrays.

5. Apparatus for regulating fluid flow from a first conduit via a second conduit including heat transfer means and fluid propelling means to a third conduit and wherein a fourth conduit extends between the (first) junction of the first and second conduits and the (second) junction of the second and third conduits, the apparatus comprising means for sensing the temperature $T_1$ of fluid in the first conduit proximate to the first junction, means for sensing the temperature $T_2$ of fluid in the third conduit proximate to the second junction, means for sensing the temperature $T_3$ of fluid in the second conduit proximate to the second junction, means for sensing the temperature $T_4$ of fluid in the second conduit proximate to the first junction, said fluid-propelling means being operable to propel fluid through the second conduit to overcome the fluid pressure drop in said heat transfer means, and control means operable to regulate the supply of power to said fluid propelling means in an amount related to the function $(T_1-T_4)-(T_2-T_3)$ whereby to regulatte the flow of fluid through the fourth conduit to substantially zero.

6. Apparatus as in claim 5 in which the heat transfer means is an air preheater for transferring heat from fluid flowing in the second conduit to air passing to a furnace or other heated-air-consuming equipment.

7. Apparatus as in claim 6 wherein the first conduit is connected to receive flue gas from a furnace, the third conduit forms part of a connection to a stack for said furnace, the fourth conduit is a by-pass duct in parallel with said second conduit and the fluid propelling means is an induced draft fan downstream of the air preheater.

8. Apparatus as in claim 7 including at least one normally closed damper in said fourth conduit for directing fluid flow through said second conduit whereby upon malfunction of said induced draft fan said damper may be opened to facilitate flow of flue gases directly to said stack through said fourth conduit.

* * * * *